July 12, 1932. J. P. SALMON 1,866,672
PIPE CONNECTER
Filed May 16, 1930
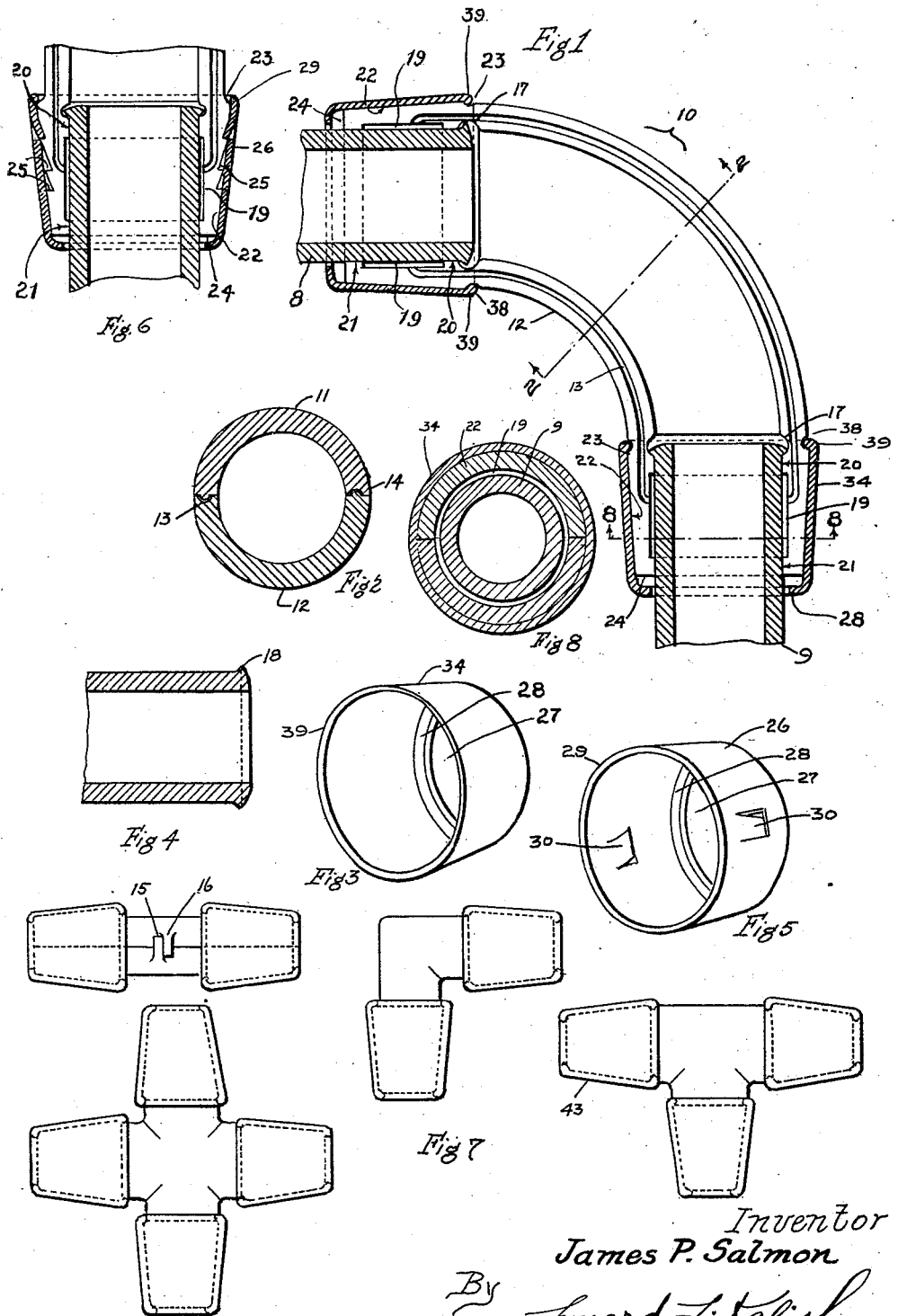
Inventor
James P. Salmon
By Leonard L. Kalish
Attorney Patented July 12, 1932

1,866,672

UNITED STATES PATENT OFFICE

JAMES P. SALMON, OF PHILADELPHIA, PENNSYLVANIA

PIPE CONNECTER

Application filed May 16, 1930. Serial No. 452,823.

The invention relates to pipe connecters adapted for connecting the ends of pipes without the use of threads or equivalent means.

My invention relates more particularly to a pipe connecter, adapted for joining iron piping used for electrical wiring conduit, which is composed of two similar longitudinally split halves which may be mounted upon two juxtaposed pipe ends and assembled thereon in place without moving, turning, or displacing the pipes and without threading or in any way preparing the ends of the pipes.

My invention further relates to a longitudinally separable pipe connecter for electrical wiring conduits and other similar work, which is held in assembled relation merely by one or more tapered retaining sleeves which may be applied to the connecter without the aid of any special tools, and whereby the connecting device is permanently and securely affixed to the pipe ends.

The object of my invention is to provide a pipe connecter of any desired shape or angle or size, which may be affixed merely to the raw ends of iron pipe without any threading or other preparation, and with a considerable saving of labor and time.

Other objects and advantages will be apparent from the accompanying specification and drawing.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawing, in which like reference characters indicate like parts:—

Figure 1 represents a longitudinal sectional view of a connecting joint embodying my invention.

Figure 2 represents a section on line 2—2 of Figure 1.

Figure 3 represents a perspective view of one form of the tapered sleeve members.

Figure 4 represents a longitudinal sectional view of the cut end of a pipe.

Figure 5 represents a perspective view of a modified form of the tapered sleeve.

Figure 6 represents a longitudinal sectional view of the modified form of construction using the tapered sleeve of Figure 5.

Figure 7 is a view showing various shapes of connecting joints.

Figure 8 represents a section on line 8—8 of Figure 1.

In the drawing in Figure 1 are shown the ends 8 and 9 of two ordinary pipes, with an "elbow" connecter of my novel construction between the two ends, whereby a continuous pathway is provided from one end to the other. The connecter designated generally by the character 10 is formed in two longitudinally divided equal or similar half sections 11 and 12, which may be provided with corresponding tongues and grooves along their longitudinal contacting edges, as seen in Figure 2 at 13 and 14. Interlocking lugs 15 and 16 may also be provided, extending from the edges of both half sections, further to interlock and adjust them in an axial direction.

The ends of the sections 11 and 12 are each provided on their inside faces with annular grooves 17, which are adapted to receive the slight raised beads or burrs on the conventionally cut ends 8 and 9 of the pipes. This bead 18, shown particularly in Figure 4, usually results from the cutting action of wedge shaped circular cutters commonly used upon iron pipe, the said cutters, while forcing an annular groove into the pipe to sever the same, raise corresponding burrs or beads on both sides of the groove.

The ends of the sections 11 and 12 are each provided on their inside faces with annular clearance recesses 19, giving rise to the annular gripping faces 20 and 21, which are adapted to fit snugly against the outside surface of the pipe. The outer surfaces of the ends of the sections 11 and 12 are provided with a suitable taper as shown at 22 from the point 23 to the end 24. These outer tapered surfaces of the two sections 11 and 12 may be provided with a series of annular rearward shoulders 25, by forming corresponding grooves in the tapered surfaces 22.

The sections of the pipe connecter may be made of any suitable material, such as cast iron or the like, or they may be pressed out of sheet steel or pressed from some other ductile metal.

The tapered retaining sleeve 26 is provided at one end with the opening 27, and may also be provided with a slight inturned transverse flange 28; the opening 27 being just sufficiently large to fit over the bead 18 of the pipe. The sleeves 26 are tapered from the larger diameter end 29 to the smaller diameter end 28, to an extent substantially the same as the taper on face 22 of the sections 11 and 12 of the connecter. Two or more spring tongues or detents 30 may be formed in the sleeves 26, pressed out of the wall thereof, as shown in Figures 5 and 6. The sleeves may be made of any suitable material, such as wrought iron or steel, and are preferably punched out or drawn.

If desired, instead of employing a series of rearward shoulders 25, cut into or formed in the tapered surfaces 22 of the connecter sections 11 and 12, and instead of providing a plurality of detents 30, pressed out of the sleeves 26, plane tapered sleeves 34 may be employed, together with plane tapered ends on the connecter sections, as shown in Figure 1. In this modification of the invention, the sleeves 34 are merely driven on to the tapered ends of the connecter sections and the edges 39 of the sleeves are then hammered over slightly in an inward direction, so as to interlock with the shoulder formed on the connecter sections at the point 38.

In either modification of the invention, the two juxtaposed half sections 11 and 12 of the connecter are fitted over the ends of the pipe 8 and 9, in a general manner indicated in Figures 1 and 6, and the sleeves 26 or 34 are then applied as shown. In assembling these connecters on pipes, it is necessary to place the sleeves 26 or 34 over the ends of the pipe first, and then to apply the connecters.

In Figures 2 and 8, transverse sections of the connecter are shown. Instead of tongue-and-grooving the edges of the two sections 11 and 12, along the major portion of their extent, the two sections may be formed with plain edges, or with any suitable rabbeted edges. If desired, suitable packing material may be inserted between the edges.

In the figures designated collectively by the numeral 7, I have illustrated a variety of connecters embodying this invention. Thus, these connecters may be straight, 90°, L, cross or T shaped, or any other suitable form in which connecters are generally made.

The connecters may be formed of pressed metal or cast metal, while the sleeves may be formed by drawing or pressing.

The advantages of this novel form of connecter are many, particularly in the installation of electrical conduit pipe in new buildings, where screw-threading and turning of pipes and connecters is entirely eliminated by my novel invention.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:—

1. A longitudinally divided, two-part tubular pipe connecter, adapted to receive in its free ends the ends of pipes to be joined, said connecter having an inwardly facing annular shoulder in the interior thereof, spaced a suitable distance inwardly from each of the free ends thereof, for engagement with the annular burrs on the cut ends of the pipes; the outer terminal surfaces of each of the free ends of said connecter being tapered, tapered sleeves adapted to fit over said tapered ends of the connecter to retain the two juxtaposed parts thereof in assembled relation on the ends of the pipes, and means to lock said tapered sleeves on the tapered ends of the connecter, including a rearward shoulder on said tapered ends of the connecter and an inwardly extending projection on said sleeves adapted to interlock with said shoulder.

2. A longitudinally divided, two-part tubular pipe connecter adapted to receive in its free ends the ends of pipes to be joined, said connecter having an annular groove in the interior thereof, spaced a suitable distance inwardly from each of the free ends thereof, to receive and to interlock with the annular burrs on the cut ends of the pipes; sleeves adapted to fit over the ends of the connecter to retain the two juxtaposed parts thereof in assembled relation on the ends of the pipes, and means to lock said sleeves on the ends of the connecter, including a rearward shoulder on said ends of the connecter, and an inwardly extending projection on said sleeves adapted to interlock with said shoulder.

3. A longitudinally divided, two-part tubular pipe connecter adapted to receive in its free ends the ends of pipes to be joined, said connecter having an inwardly facing annular shoulder in the interior thereof, spaced a suitable distance inwardly from each of the free ends thereof, for engagement with the annular burrs on the cut ends of the pipes, and having also an annular inner gripping face disposed between said shoulder and the free end of said connecter, to engage and to grip the outer surface of each pipe to be joined; the outer terminal surface of the free ends of said connecter being tapered, tapered sleeves adapted to fit over said tapered ends of the connecter to retain the two juxtaposed parts thereof in assembled relation about the ends of the pipes, and means to lock said tapered sleeves on the tapered ends of the connecter, including a rearward shoulder on said tapered ends of the connecter and an inwardly extending projection on said sleeves adapted to interlock with said shoulder.

4. A pipe connecter comprising two semi-tubular shells adapted to be brought into registry with each other to form a singular tube, said shells having interlocking means to hold said tube against transverse displacement of the respective parts thereof, said connecter being adapted to receive in its free ends the ends of pipes to be joined;—each of said shells thereof having an inner, semi-annular groove about its inner diameter to receive and to interlock with the burred end of a cut pipe; sleeves adapted to fit over the free ends of said tube, to retain the juxtaposed parts thereof in assembled relation on the ends of the pipes, and means to lock said sleeves on the ends of the connecter, including a rearward shoulder on said ends of the connecter and an inwardly extending projection on said sleeves adapted to interlock with said shoulder.

5. A pipe connecter comprising two semi-tubular shells adapted to be brought into registry with each other to form a singular tube, each of said shells having on one longitudinal rim thereof, a raised tongue portion, and on the other longitudinal rim thereof a generally corresponding groove portion, said tongue and groove portions of each shell being adapted to interlock with corresponding and co-acting groove and tongue portions of the other registering shell to prevent relative displacement of the respective parts of said tube;—said connecter being adapted to receive in its free ends the ends of pipes to be joined;—each of said shells thereof having an inner, semi-annular groove about its inner diameter to receive and to interlock with the burred end of a cut pipe; sleeves adapted to fit over the free ends of said tube, to retain the juxtaposed parts thereof in assembled relation on the ends of the pipes, and means to lock said sleeves on the ends of the connecter, including a rearward shoulder on said ends of the connecter and an inwardly extending projection on said sleeves adapted to interlock with said shoulder.

6. A longitudinally divided, two-part tubular pipe connecter, adapted to receive in its free ends the ends of pipes to be joined, said connecter having an inwardly facing annular shoulder in the interior thereof, spaced a suitable distance inwardly from each of the free ends thereof, for engagement with the annular burrs on the cut ends of the pipes; the outer terminal surfaces of each of the free ends of said connecter being generally tapered, correspondingly tapered sleeves adapted to fit over said tapered ends of the connecter to retain the two juxtaposed parts thereof in assembled relation on the ends of the pipes, and means to engage said tapered sleeves on the tapered ends of the connecter, including a serrated surface of one co-acting with the surface of the other operatively to grip the same.

In testimony whereof, I have hereunto set my hand this 1st day of October, 1929.

JAMES P. SALMON.